Feb. 16, 1937.  L. G. COPEMAN  2,071,112
BUCKET AND BUCKET PROTECTOR
Filed Oct. 28, 1935
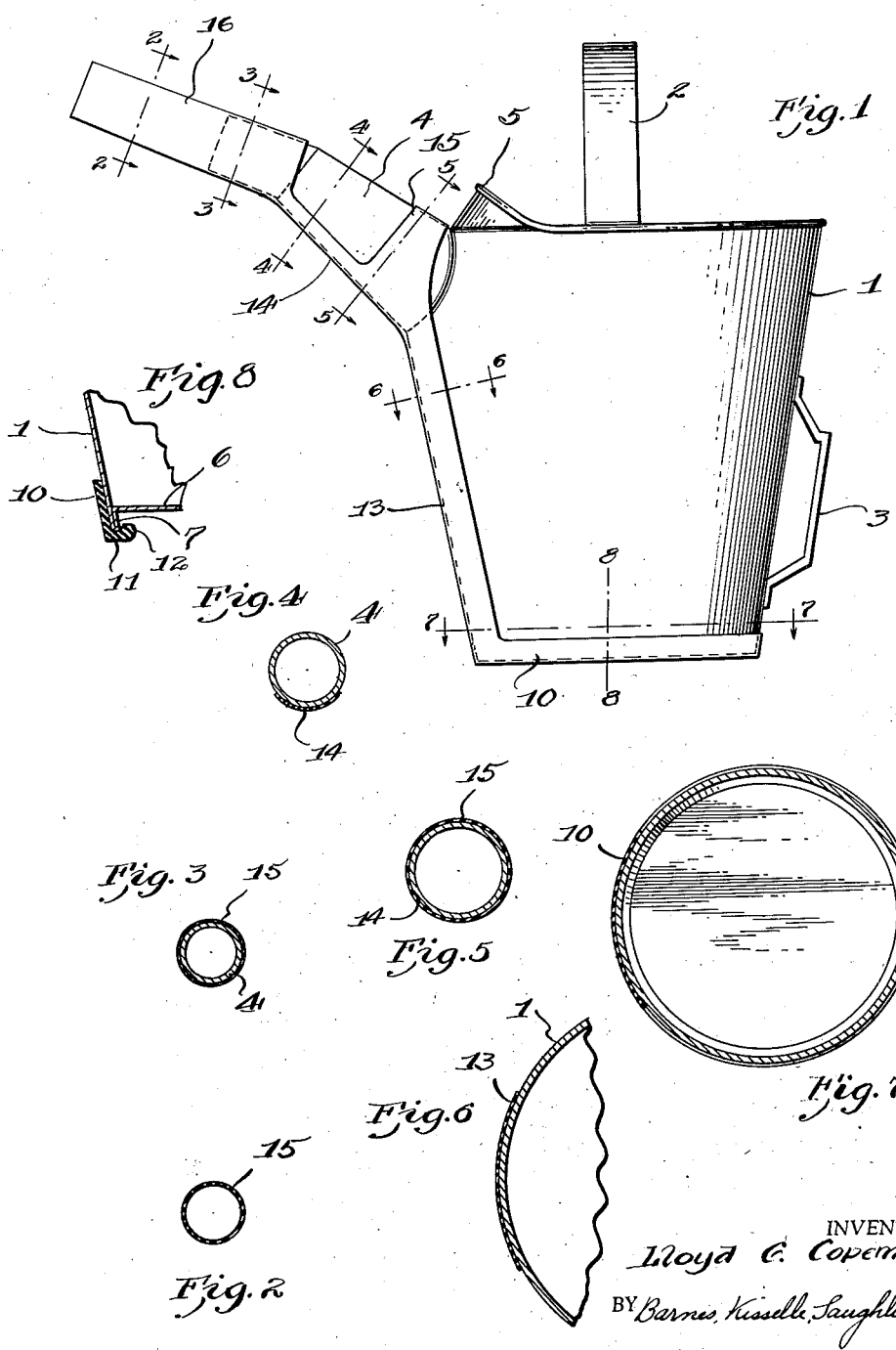
INVENTOR.
Lloyd G. Copeman
BY Barnes, Kisselle, Laughlin & Raisch
ATTORNEYS Patented Feb. 16, 1937

2,071,112

UNITED STATES PATENT OFFICE 2,071,112

BUCKET AND BUCKET PROTECTOR

Lloyd G. Copeman, Flint, Mich., assignor to Copeman Laboratories Company, Flint, Mich., a corporation of Michigan Application October 28, 1935, Serial No. 47,069

14 Claims. (Cl. 221—11)

This invention relates to a bucket and bucket protector and has to do particularly with the spouted type of bucket commonly used for filling automobile radiators with water or other liquid.

Due largely to the present automobile design, particularly passenger cars, it has become somewhat difficult to fill radiators. The filler tubes on many passenger cars are located underneath the hood and to the rear of the radiator shell. It is difficult to reach the filler tubes either from the side or from the front, due to the large wide fenders and forwardly projecting parts, such as the radiator, lamps, fenders, bumpers, etc. These filler tubes, being under the hood, lie below the radiator shell, that is, at a lower elevation than the top of the shell. Even where the filler tube comes up through the top of the radiator shell and is closed by a radiator cap, it is becoming more difficult to reach the same because of the structure extending out in front of the radator, such as the forwardly overhanging radiator grill, fenders, lamps, bumper, etc.

Due to this difficulty the person attempting to fill a radiator often finds himself in an awkward position in attempting to hold a bucket full of water with arms outstretched, etc., with the result that the bucket is often rested upon part of the vehicle, such as a fender, the top of the radiator shell, or the like. The buckets used are, for the most part, of sheet metal construction and very often galvanized sheet steel, and the surfaces thereof are not particularly smooth. As a result, the polished exposed surfaces of the fender, radiator shell or other parts of the vehicle which come into contact with the bucket are often scarred or scratched. This is particularly annoying in the case of new vehicles. The radiators have to be filled before the car is sold and any small scratch or scar on the surface immediately creates a sales resistance for that particular vehicle. After the car is in the hands of a private owner, the radiator, of course, has to be filled with water from time to time and very often an attendant at a filling station is not very careful, with the result that some of the finished parts of the car are quickly stratched and the polished surface ruined.

It is the object of this invention to overcome these objections, while at the same time a sheet metal spouted bucket may be used, inasmuch as these buckets are of a desirable type and are obtainable at a relatively low cost. To this end a bucket protector is provided which preferably is made of rubber or other relatively soft, non-scratching material, and which is preferably of a skeleton construction so that it embodies a minimum amount of rubber or other material to thus be obtainable at a low cost, but which protects and covers those parts of the bucket most likely to come into contact with and scratch the vehicle surfaces. Moreover, the invention contemplates a structure wherein the metal spout is provided with an extension formed integrally with the skeleton protector. This extension may be projected into the radiator filler tube and the protected metal spout rested upon the rim of the filler tube, and in this way the water or other liquid discharged into the filler tube is prevented from spilling and is more positively directed into the filler tube. While the invention is apparently particularly adaptable for use on buckets for filling automobile radiators, it is, of course, not limited to such use; the advantages of the invention, however, are particularly noticeable when used on such buckets, and this use has been selected to demonstrate the advantages in the best possible way.

In the accompanying drawing:

Fig. 1 is a view of a spouted bucket with a protector thereon.

Fig. 2 is a cross sectional view taken on line 2—2 of Fig. 1.

Fig. 3 is a cross sectional view taken on line 3—3 of Fig. 1.

Fig. 4 is a cross sectional view taken on line 4—4 of Fig. 1.

Fig. 5 is a cross sectional view taken on line 5—5 of Fig. 1.

Fig. 6 is a sectional view showing part of the bucket and protector taken on line 6—6 of Fig. 1.

Fig. 7 is a horizontal sectional view taken substantially on line 7—7 of Fig. 1.

Fig. 8 is a sectional view taken through a part of the side and bottom of the bucket substantially on line 8—8 of Fig. 1.

The bucket shown in Fig. 1 demonstrates a conventional sheet metal bucket having a body 1, a bail 2 and it may have a handle at the back as shown at 3. A metal spout is shown at 4 which may be guarded by a lip 5. The bottom of the bucket is shown at 6 (Fig. 8) and, as is usually the case, the bottom is inset relative to the side walls leaving a peripheral bottom flange 7. Buckets of this type vary as to structural details; in some the handle may be constructed differently than that shown herein; for example, the bail 2 may be swivelled to the body of the bucket. Also, the formation of the spouts are subject to variation. Some spouts more or less terminate at the top of the bucket, as shown in Fig. 1, while others have a considerable tapered shape with the lower wall thereof extending almost to the bottom of the bucket, and the upper wall of the spout merging into the top of the bucket. Regardless of the particular shape of the bucket, however, a skeleton protector may be applied thereto and fall within the scope of this invention.

The protector preferably may be made of rubber with the parts either molded into one piece, or the different pieces assembled together and held by vulcanizing or the like, so that, on the whole, the protector may be termed an integral structure. As herein shown, the protector comprises a bottom ring 10 which extends around the bottom of the bucket and has an inwardly extending flange 11 lying under the flange 7. The flange 11 may be beaded as at 12 so that the ring is effectively held in position. Extending upwardly from the ring on the forward side of the bucket, considering the forward side of the bucket as the spout side, is an apron 13. This apron is in the nature of a strip of such width as to cover a sufficient portion of the bucket to prevent the same from contacting with the surfaces of the car. The apron 13 continues to cover the forward and underside of the spout as shown at 14. A band 15 connects to the apron and is designed to encircle the spout as shown. The protector includes a tubular spout member 16 designed to be placed over the end of the metal spout 4, as shown, and this connects with the portion 14.

Preferably, the protector, when made of rubber, is so proportioned that when the same is applied to a bucket the rubber is stretched so that at all times while the protector is on a bucket the rubber is held taut. As a result the ring 10 tightly grips the bottom of the bucket, and the band 15 and spout 16 are stretched over the metal spout 4. Also, the protector is preferably so proportioned that the apron 13 is held and held taut, and in fact in stretched condition. In this manner the protector tightly grips all underlying portions of the metal bucket and retains itself in position. It protects the bottom of the bucket, the spout and the forward side of the bucket and spout, and prevents the metal bucket from coming into direct contact with the parts of an automotive vehicle. Thus, if an operator rests the bottom of the bucket on a part of the car or allows the spout to rest upon or come into contact with a part of the car, the car is protected from being scratched or marred. The tubular projection 16 may be inserted into the radiator filler tube and the protected metal spout allowed to rest upon the mouth of the filler tube. Thus the water or other liquid introduced into a radiator is effectively retained from spilling.

A further advantage may be noted in that the bucket is electrically insulated by the rubber protector so that the operator or handler is protected from electric shock in the event of contact with an electrically charged part of the vehicle, such as a high tension cable, a spark plug, or other electrical apparatus.

In some of the claims appended hereto use is made of the term "band" around the spout. This term is to be construed as one of description and not one of limitation and is intended to cover an element which encircles the spout, even though it be integral with or forms a part of the outlet.

I claim:

1. As a new article of manufacture, a protector for a spouted bucket, comprising a ring member for extending around the bottom edge of the bucket, a band for extending around the spout of the bucket, and an apron connected to and extending from the band to the ring and adapted to cover the front portion of the bucket.

2. As a new article of manufacture, a protector for a spouted bucket, comprising a body of relatively soft material so as not to scratch finished surfaces, and having a ring portion for extending around the bottom edge of the bucket and underlying said edge, a band for extending around the spout, and an apron extending from the band to the ring and connected thereto and adapted to cover the front portion of the bucket.

3. As a new article of manufacture, a rubber protector for a spouted bucket, comprising a ring for extending around the bottom edge of the bucket and underlying said edge, a band for extending around the spout, and an apron extending from the band to the ring and connected thereto, said apron adapted to cover the front portion of the bucket to protect the same from contact with outside structure.

4. As a new article of manufacture, a rubber protector for a spouted bucket, comprising a ring for extending around the bottom edge of the bucket and underlying said edge, a band for extending around the spout, and an apron extending from the band to the ring and connected thereto, said apron adapted to cover the front portion of the bucket to protect the same from contact with outside structure, said ring and band being applied to the bucket in stretched form and the apron being held taut between the ring and band.

5. As a new article of manufacture, a protector for a spouted bucket, comprising a ring for extending around the bottom edge of the bucket and underlying said edge, a tubular outlet member adapted to be sleeved over the bucket spout, and an apron extending from the tubular outlet to the ring and connected thereto and adapted to cover the front portion of the bucket, said ring, outlet member and apron being made of relatively soft non-scratching material.

6. As a new article of manufacture, a rubber protector for a spouted bucket, comprising a ring for extending around the bottom edge of the bucket and underlying said edge, a tubular outlet member adapted to be sleeved over the bucket spout, and an apron extending from the tubular outlet to the ring and connected thereto and adapted to cover the front portion of the bucket, said ring and tubular outlet members being applied to the bucket in stretched condition and the apron being held taut between the tubular outlet and ring.

7. As a new article of manufacture, a rubber protector for a spouted bucket, comprising a ring for extending around the bottom edge of the bucket and underlying the same, a tubular outlet adapted to be sleeved over the bucket spout, a band for extending around the bucket spout, and an apron extending from the ring to the band along the front side of the bucket, said apron being connected to the ring, band and outlet member, said protector being applied to the bucket in stretched form with the apron held taut and adapted to protect the front portion of the bucket.

8. As a new article of manufacture, a protector for a spouted bucket comprising a ring for extending around the outside lower portion of the bucket, said ring having an inwardly extending flange underlying the bottom edge of the bucket, means for extending around the bucket spout for protecting the same, and an apron extending from said means to the ring and adapted to protect the forward portion of the bucket.

9. In combination with a spouted metal bucket, a protector of relatively soft non-scratching material having a ring portion extending around the bottom edge of the bucket and underlying the same, and having means for protecting the spout including a tubular outlet sleeved over said spout, and an apron for protecting the forward portion of the bucket extending from the spout to the ring and connected to the ring and the said means for protecting the spout.

10. In combination with a spouted metal bucket, a protector of rubber having a ring portion extending around the bottom edge of the bucket and underlying the same, and having means for protecting the spout including a tubular outlet sleeved over said spout, and an apron for protecting the forward portion of the bucket extending from the spout to the ring and connected to the ring and the said means for protecting the spout.

11. The combination with a spouted metal bucket having a bottom inset upwardly from the lower edge of the bucket, a protector comprising a rubber ring extending around the bottom edge of the bucket, said ring having a beaded flange underlying the lowermost edge of the bucket with the bead on the opposite side of the peripheral wall of the bucket from said ring, an outlet member sleeved over the bucket spout, and an apron extending from the ring to the outlet member and connected to both for protecting the forward portion of the bucket.

12. As a new article of manufacture, a protector for a spouted bucket, comprising a body of relatively soft material so as not to scratch finished surfaces, said body having a ring-like portion for extending around the body of the bucket, a band for extending around the spout, and an apron extending from the band to the ring-like portion and connected thereto and adapted to cover the front portion of the bucket.

13. As a new article of manufacture, a protector for a spouted bucket, comprising a body of relatively soft material so as not to scratch finished surfaces, said body having a ring-like portion for extending around the lower part of the body of the bucket, a band for extending around the spout, and an apron extending from the band to the ring-like portion and connected thereto and adapted to cover the front portion of the bucket.

14. In combination with a spouted metal bucket, a protector of relatively soft non-scratching material having a ring portion extending around the body of the bucket, and having means for protecting the spout including a tubular outlet sleeved over said spout, and an apron for protecting the forward portion of the bucket extending from the spout to the ring portion and connected to the ring portion and the said means for protecting the spout.

LLOYD G. COPEMAN.